United States Patent
Li et al.

(10) Patent No.: US 12,548,306 B2
(45) Date of Patent: Feb. 10, 2026

(54) METHOD, DEVICE AND STORAGE MEDIUM FOR TRAINING MODEL BASED ON MULTI-MODAL DATA JOINT LEARNING

(71) Applicant: BEIJING BAIDU NETCOM SCIENCE TECHNOLOGY CO., LTD., Beijing (CN)

(72) Inventors: Wei Li, Beijing (CN); Can Gao, Beijing (CN); Guocheng Niu, Beijing (CN); Xinyan Xiao, Beijing (CN); Hao Liu, Beijing (CN); Jiachen Liu, Beijing (CN); Hua Wu, Beijing (CN); Haifeng Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 547 days.

(21) Appl. No.: 17/809,133

(22) Filed: Jun. 27, 2022

(65) Prior Publication Data

US 2022/0327809 A1 Oct. 13, 2022

(30) Foreign Application Priority Data

Jul. 12, 2021 (CN) .......................... 202110781928.8

(51) Int. Cl.
*G06V 10/778* (2022.01)
*G06F 40/284* (2020.01)
(Continued)

(52) U.S. Cl.
CPC .......... *G06V 10/778* (2022.01); *G06F 40/284* (2020.01); *G06V 10/26* (2022.01); *G06V 10/774* (2022.01)

(58) Field of Classification Search
CPC .... G06V 10/82; G06V 10/774; G06V 10/811; G06V 10/776; G06V 10/778;
(Continued)

(56) References Cited

U.S. PATENT DOCUMENTS

| 10,789,427 | B2 * | 9/2020 | Shazeer | G06F 18/10 |
| 2017/0330054 | A1 | 11/2017 | Fu et al. | |
| 2021/0248446 | A1 * | 8/2021 | Hughes | G06N 3/045 |

FOREIGN PATENT DOCUMENTS

| CN | 109886326 A | 6/2019 |
| CN | 111967470 A | 11/2020 |

(Continued)

OTHER PUBLICATIONS

S. Rastegar, M. S. Baghshah, H. R. Rabiee and S. M. Shojaee, "MDL-CW: A Multimodal Deep Learning Framework with CrossWeights," 2016 IEEE Conference on Computer Vision and Pattern Recognition (CVPR), Las Vegas, NV, USA, 2016, pp. 2601-2609, doi: 10.1109/CVPR.2016.285. (Year: 2016).*

(Continued)

*Primary Examiner* — Courtney Joan Nelson
(74) *Attorney, Agent, or Firm* — OSHA BERGMAN WATANABE & BURTON LLP

(57) ABSTRACT

A method for training a model based on multi-modal data joint learning, includes: obtaining multi-modal data; in which the multi-modal data include at least one type of single-modal data and at least one type of Pair multi-modal data; inputting the single-modal data and the Pair multi-modal data into a decoupling attention Transformer network model to generate respectively Token semantic representation features and cross-modal semantic representation features; and training the decoupling attention Transformer network model based on the Token semantic representation features and the cross-modal semantic representation features.

12 Claims, 5 Drawing Sheets

(51) Int. Cl.
*G06V 10/26* (2022.01)
*G06V 10/774* (2022.01)

(58) Field of Classification Search
CPC .......... G06V 10/26; G06N 3/08; G06N 3/045; G06N 3/0455; G06N 20/00; G06N 3/044; G06N 3/0464; G06N 3/09; G06T 2207/20081; G06T 2207/20084; G06F 40/30; G06F 40/284; G06F 18/256; G06F 40/56; G06F 16/24522
See application file for complete search history.

(56) References Cited

FOREIGN PATENT DOCUMENTS

| CN | 112668671 A | 4/2021 |
|---|---|---|
| CN | 112861945 A | 5/2021 |

OTHER PUBLICATIONS

Pan, Hongliang, et al. "Modeling intra and inter-modality incongruity for multi-modal sarcasm detection." Findings of the Association for Computational Linguistics: EMNLP 2020. 2020. (Year: 2020).*

Hendricks, Lisa Anne, et al. "Decoupling the role of data, attention, and losses in multimodal transformers." Transactions of the Association for Computational Linguistics 9 (2021): 570-585. (Year: 2021).*

Office Action issued for Japanese patent application 2022-108385, mailed Aug. 8, 2023 (8 pages).

Lisa Anne Hendricks, et al.; "Decoupling the Role of Data, Attention, and Losses in Multimodal Transformers;" Transactions of the Association for Computational Linguistics; vol. 9; pp. 570-585; 2021 (16 pages).

Ronghang Hu, et al.; "UniT Multimodal Multitask Learning with a United Transformer;" Facebook AI Research (FAIR); Mar. 29, 2021 (16 pages).

Hongliang Pan, et al.; "Modeling Intra and Inter-modality Incongruity for Multi-Modal Sarcasm Detection;" Findings of the Association for Computational Linguistics: EMNLP 2020; pp. 1383-1392; Nov. 16-20, 2020 (10 pages).

Wei Li, etc. "UNIMO: Towards Unified-Modal Understanding and Generation via Cross-Modal Contrastive Learning;" Proceedings of the 59th Annual Meeting of the Association for Computational Linguistics and the 11th International Joint Conference on Natural Language Processing; Aug. 1-6, 2021; pp. 2592-2607.

First Office Action issued in corresponding Chinese application 202110781928.8, mailed on Aug. 17, 2021 (14 pages).

Second Office Action issued for corresponding Chinese application 202110781928.8, mailed on Sep. 10, 2021 (14 pages).

Decision on Rejection for issued for corresponding Chinese Application 202110781928.8, mailed on Oct. 29, 2021 (13 pages).

* cited by examiner

METHOD, DEVICE AND STORAGE MEDIUM FOR TRAINING MODEL BASED ON MULTI-MODAL DATA JOINT LEARNING

CROSS-REFERENCE TO RELATED APPLICATION

This application claims priority to Chinese Patent Application No. 202110781928.8, filed on Jul. 12, 2021, the entire content of which is incorporated herein by reference.

TECHNICAL FIELD

The disclosure relates to the field of computer technologies, and specifically to a modal learning method, an electronic device and a storage medium for multi-scene cognition.

BACKGROUND

With the continuous development of Internet technologies, there are a large number of different modalities of data in the network, such as text, images, audio and video.

In the related art, based on different types of data processed, application tasks in the field of artificial intelligence (AI) technologies are divided into natural language processing, computer vision, speech recognition, etc. This task-oriented division has resulted in the general focus on single-modal data and the design of technical solutions for single-modal data understanding, while ignoring the need for AI to comprehensively learn multi-modal data.

SUMMARY

According to an aspect of the disclosure, a method for training a model based on multi-modal data joint learning is provided and includes: obtaining multi-modal data; in which the multi-modal data include at least one type of single-modal data and at least one type of Pair multi-modal data; inputting the single-modal data and the Pair multi-modal data into a decoupling attention Transformer network model to generate respectively semantic element Token semantic representation features and cross-modal semantic representation features; and training the decoupling attention Transformer network model based on the Token semantic representation features and the cross-modal semantic representation features.

According to another aspect of the disclosure, an electronic device is provided and includes: at least one processor; and a memory communicatively connected to the at least one processor; in which the memory is configured to store instructions executable by the at least one processor, and when the instructions are performed by the at least one processor, the at least one processor is caused to perform the method as described above.

According to another aspect of the disclosure, a non-transitory computer-readable storage medium stored with computer instructions is provided, in which the computer instructions are configured to cause a computer to perform the method as described above.

It should be understood that, the content described in this section is not intended to indicate key or important features of embodiments of the disclosure, nor intended to limit the scope of the disclosure. Other features of the disclosure will be easy to be understood through the following specification.

BRIEF DESCRIPTION OF THE DRAWINGS

The drawings are intended to better understand the solution and do not constitute a limitation to the disclosure, in which.

DETAILED DESCRIPTION

Embodiments of the disclosure are described as below with reference to the drawings, which include various details of embodiments of the disclosure to facilitate understanding, and should be considered as merely exemplary. Therefore, those skilled in the art should realize that various changes and modifications may be made on embodiments described herein without departing from the scope and spirit of the disclosure. Similarly, for clarity and conciseness, descriptions of well-known functions and structures are omitted in the following descriptions.

In the related art, to deal with tasks of multi-modal data scenarios such as image-text retrieval and visual questioning-answering, various multi-modal data pre-training models are proposed such as ViLBERT (vision-and-language bidirectional encoder representation from transformers). The multi-modal data pre-training model performs self-supervised learning based on image-text pairs to learn joint semantic representation features of the image-text pairs. However, the multi-modal data pre-training model may be trained only on small-scale data due to a limitation that only strongly-correlated image-text pair data may be used, and the trained model is difficult to perform on single-modal tasks (such as text tasks or image tasks).

As a result, the inventors of the disclosure found that the pre-training model for single-modal data or strongly-correlated image-text pair data has many deficiencies: (1) specific semantic representation features may be obtained only based on specific types of data, lacking generality; (2) it is impossible to uniformly model different modal data, so that mutual enhancement between modalities may not be used to learn more robust general semantic representation capabilities; (3) the modeling methods for different modal data are different and the model is not universal, so it is impossible to effectively unify different modal data in the semantic space; (4) the existing multi-modal pre-training methods are only oriented to strongly-correlated images and image description data, and the data scale is limited and does not meet needs of practical applications.

How to make full use of the single-modal data (text, picture, video, etc.) and the multi-modal data (image-text combination, video-text combination, etc.) naturally generated in the Internet at the same time, so that the deep neural network may combine knowledge and information of multiple modalities like human to obtain more robust and powerful general semantic representation capabilities from data of multiple modalities, which is of great significance for the development of artificial intelligence.

Figure 1:
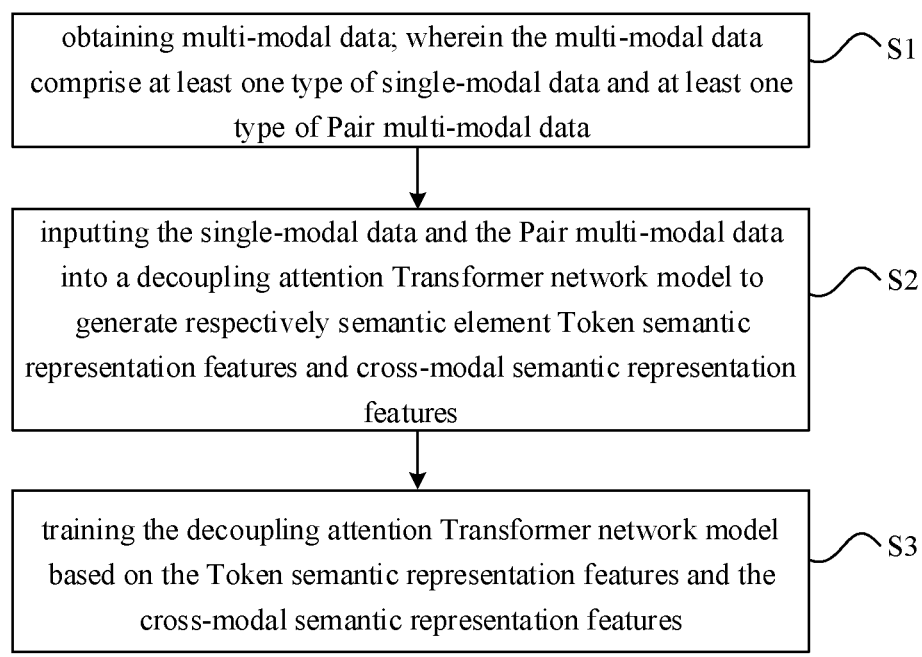
FIG. 1 is a schematic diagram according to a first embodiment of the disclosure.

Based on this, the disclosure provides a method for training a model based on multi-modal data joint learning. FIG. 1 is a schematic diagram according to a first embodiment of the disclosure. As shown in FIG. 1, the method includes the following.

S1, multi-modal data are obtained. The multi-modal data include at least one type of single-modal data and at least one type of Pair multi-modal data.

There are a large number of different types of data on the Internet. In embodiments of the disclosure, different types of data may be captured from the Internet through a search engine, including image data, text data, audio data, image-text pair data, video-text pair data and the like.

It should be understood that the single-modal data refers to data of a single modal, such as text data, image data. The Pair multi-modal data may be such as image-text combination data, video-text pair data and the like.

In embodiments of the disclosure, the multi-modal data include at least one type of single-modal data and at least one type of Pair multi-modal data, which may one or more types of single-modal data and one or more types of Pair multi-modal data, which is not limited in embodiments of the disclosure.

S2, the single-modal data and the Pair multi-modal data are input into a decoupling attention Transformer network model to generate respectively semantic element Token semantic representation features and cross-modal semantic representation features.

The decoupling attention Transformer network model in embodiments of disclosure may simultaneously use the single-modal data and the Pair multi-modal data for joint learning, and may unify the modal learning end-to-end.

In embodiments of the disclosure, the single-modal data and the Pair multi-modal data are input into the decoupling attention Transformer network model to generate respectively the Token semantic representation features and the cross-modal semantic representation features. The Token semantic representation features are generated based on the single-modal data and the cross-modal semantic representation features are generated based on the Pair multi-modal data.

S3, the decoupling attention Transformer network model is trained based on the Token semantic representation features and the cross-modal semantic representation features.

After obtaining the Token semantic representation features and the cross-modal semantic representation features, the decoupling attention Transformer network model is trained to unify the modeling for the obtaining multi-modal data including the single-modal data and the Pair multi-modal data, so that the trained model may has an ability of simultaneously handling the understanding and generation tasks of multi-modal data such as visual questioning-answering and image description generation as well as the understanding and generation tasks of single-modal data such as text classification, text generation, image classification.

With the method for training a model based on multi-modal data joint learning provided in embodiments of the disclosure, the multi-modal data are obtained, in which the multi-modal data include at least one type of single-modal data and at least one type of Pair multi-modal data; the single-modal data and the Pair multi-modal data are input into the decoupling attention Transformer network model to generate respectively the Token semantic representation features and the cross-modal semantic representation features; and the decoupling attention Transformer network model is trained based on the Token semantic representation features and the cross-modal semantic representation features. Thus the decoupling attention Transformer network model may effectively use a variety of different modal data to enhance each other, obtain the more robust and more powerful general semantic representation ability from the multi-modal data, use a unified network structure model to process data of different modalities, and perform tasks of understanding and generating data of different modalities, which may also have the more accurate scene cognition and more comprehensive logical reasoning ability.

Figure 2:
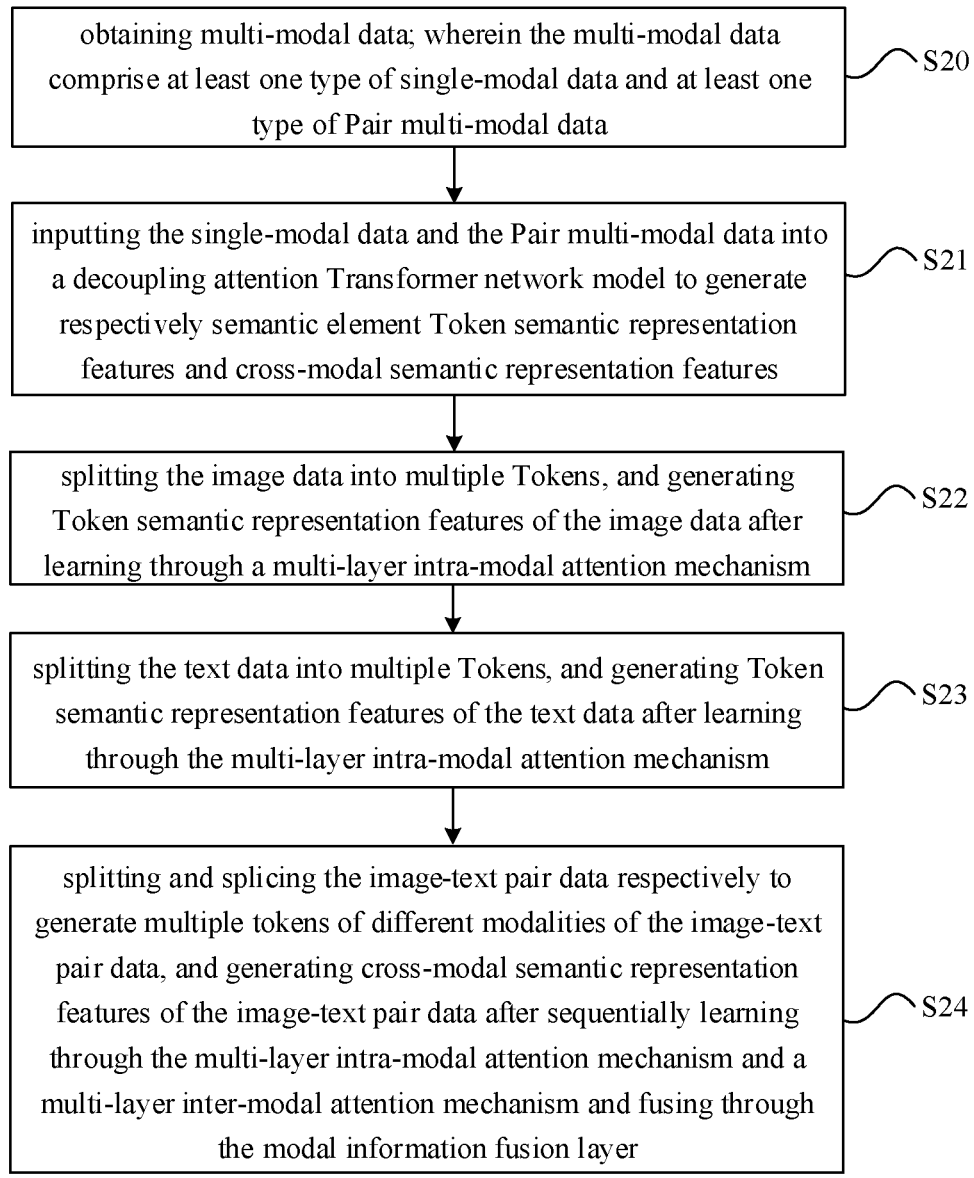
FIG. 2 is a schematic diagram according to a second embodiment of the disclosure.

FIG. 2 is a schematic diagram according to a second embodiment of the disclosure.

As shown in FIG. 2, the method for training a model based on multi-modal data joint learning provided in embodiments of the disclosure includes the following.

S20, multi-modal data are obtained. The multi-modal data include at least one type of single-modal data and at least one type of Pair multi-modal data.

In some embodiments, the at least one type of single-modal data include image data and text data. The at least one type of Pair multi-modal data include image-text pair data. The multi-modal data obtained in embodiments of the disclosure include image data, text data, and image-text pair data.

S21, the single-modal data and the Pair multi-modal data are input into a decoupling attention Transformer network model to generate respectively Token semantic representation features and cross-modal semantic representation features.

In some embodiments, the decoupling attention Transformer network model includes a network structure including an intra-modal attention mechanism, an inter-modal attention mechanism and a modal information fusion layer.

In detail, the intra-modal attention mechanism learns the interaction in the modal. The inter-modal attention mechanism learns the cross-modal information interaction. The modal information fusion layer fuses the information of different modalities to obtain the cross-modal semantics representation features. Compared with the common Transformer, the decoupling attention Transformer learning model in embodiments of the disclosure decouples the interaction in the modal and the interaction between the modalities, that is, the interaction in the modal and the interaction between the modalities in the multi-modal data are carried out respectively. Through the information fusion layer, multiple modal information fusion may be performed, so that it may be applied to single-modal data of multiple different modalities, as well as image-text pair data of different degrees of correlation.

For descriptions of S20 and S21 in embodiments of the disclosure, reference may be made to the descriptions of S1 and S2 in the foregoing embodiments, and details are not repeated here.

S22, the image data are splitted into multiple Tokens, and Token semantic representation features of the image data are generated after learning through a multi-layer intra-modal attention mechanism.

In detail, for the image data input V, the image data input V is splitted into multiple Tokens, that is, the Token represents features of each object area in which the image is splitted. Exemplarily, each image block pixel as each Token together with features of the entire image are used as the sequence as input, $V=\{[IMG], V_2, \ldots, V_n\}$, where n is a positive integer, and the special symbol [IMG] represents the features of the entire image. After learning through the multi-layer intra-modal attention mechanism, the Token semantic representation features of the image data are generated.

S23, the text data are splitted into multiple Tokens, and Token semantic representation features of the text data are generated after learning through the multi-layer intra-modal attention mechanism.

In detail, for the text data input W, the text data input W is splitted into multiple Tokens, and all Tokens are taken as input W={[CLS], $W_1$, ..., $W_t$, [SEP]}, where t is a positive integer, and the special symbols [CLS] and [SEP] represent the starting position and the ending position of the text sequence, respectively. After learning through the multi-layer intra-modal attention mechanism, the Token semantic representation features of the text data are generated.

S24, the image-text pair data are splitted and spliced respectively to generate multiple Tokens of different modalities of the image-text pair data, and cross-modal semantic representation features of the image-text pair data are generated after sequentially learning through the multi-layer intra-modal attention mechanism and a multi-layer inter-modal attention mechanism and fusing through the modal information fusion layer.

In detail, for the image-text pair data input (V, W), the image-text pair data input (V, W) is splitted and spliced separately, as the overall input (V, W)={[IMG], $V_1$, ..., $V_n$, [CLS], $W_1$, ..., $W_t$, [SEP]}, to be learned through the multi-layer intra-modal attention mechanism and the multi-layer inter-modal attention mechanism in turn, and through the modal information fusion layer to generate the cross-modal semantic representation features of the image-text pair data.

In embodiments of the disclosure, the decoupling attention Transformer learning model may learn respectively the image data and the text data through the intra-modal attention mechanism, and learn the image-text pair data through the inter-modal attention mechanism, and decouple the intra-modal attention mechanism and the inter-modal attention mechanism, and use the single-modal data and the Pair multi-modal data at the same time, so that it may be applied to a variety of different modal data, as well as a variety of image-text data with different degrees of correlation, which may realize the end-to-end learning of multi-modal semantic representation. Further, after learning the image-text pair data through the multi-layer intra-modal attention mechanism and the multi-layer inter-modal attention mechanism, the information is fused through the modal information fusion layer, and the information of different modal data is adaptively processed. The end-to-end generation of Pair multi-modal semantic representation features may be realized, so that the model may obtain more robust semantic representation capabilities.

In some embodiments, fusing through the modal information fusion layer includes: controlling cross-modal information of different modalities to fuse by a gating mechanism based on a degree of correlation between different modalities of the image-text pair data.

The degree of correlation between different modalities of the image-text pair data is determined by the content of the data. There are various forms of correlation in the image-text pair data on the Internet. For example, the text in the strongly-correlated image-text data is the description of the image, and the correlation between text and image in the weakly-correlated image-text data is relatively weak.

Exemplarily, strong correlation and weak correlation may be understood as follows. An image of a birthday cake with fruit, with the following two texts to form two image-text pairs, are strong correlation and weak correlation. The strong correlation: the text is "there are a few candles burning and a girl is blowing a candle". The weak correlation: the text is "happy birthday! My baby". Both types of data exist widely in real data, so the model needs to be able to effectively model.

The gate control mechanism for information fusion is a fusion idea, and a variety of methods may be used for specific implementation. In an exemplary embodiment, the correlation gate control weight between the intra-modal information representation and the inter-modal information representation is finally calculated by transforming the intra-modal information representation features X and the inter-modal information representation features Y through a multi-layer nonlinear transformation: $\delta$=sigmoid(MLP(A*X+B*Y))∈[0,1]; in which A and B are both transformation matrices, which are weighted based on weights to obtain the cross-modal semantic representation features Z=$\delta$*X+(1−$\delta$)*Y.

In embodiments of the disclosure, hundreds of millions of different types of image-text data are captured from the Internet through search engines. Since the semantic correlation of Pair multi-modal data in the Internet is ever-changing, there are strong correlations, weak correlations and no correlations. For different types of data, interaction between modalities may be adaptively learned. The adaptive information fusion layer adopts the gating mechanism, which may adaptively control the fusion degree of cross-modal information according to the degree of correlation of image-text data end-to-end.

Figure 3:
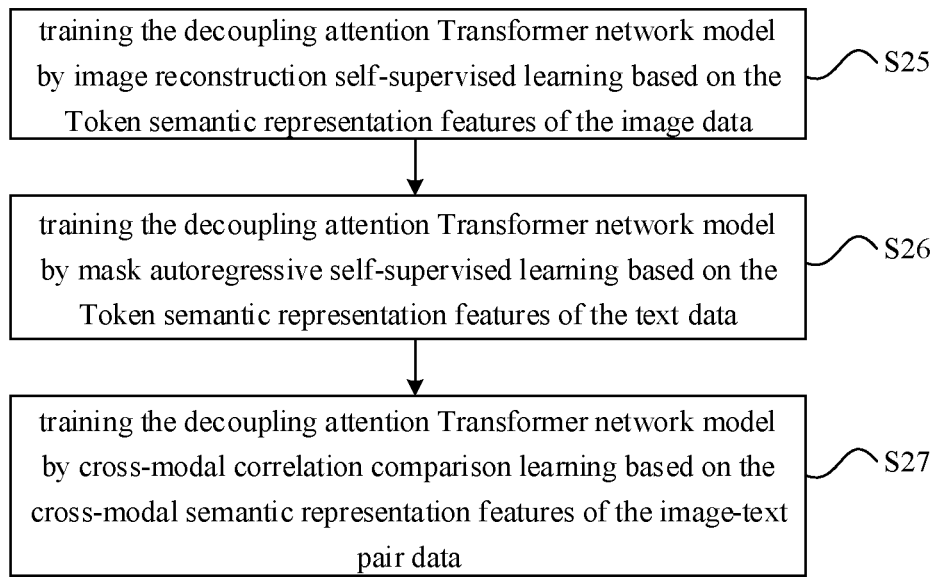
FIG. 3 is another schematic diagram according to a second embodiment of the disclosure.

As shown in FIG. 3, after the above-mentioned S24, S25 is performed.

S25, the decoupling attention Transformer network model is trained by image reconstruction self-supervised learning based on the Token semantic representation features of the image data.

The self-supervised learning of image reconstruction may be understood as follows. For the input of the image data of the image, the image is divided into n Tokens, each Token is encoded, at least one Token is taken out and not used as the input of the model, and the remaining Tokens are taken as the input to input the decoupling attention Transformer network model to obtain the Token semantic representation features of the image data. The Token taken out may be predicted, and then the predicted Token is compared with the Token taken out to adjust the parameters in the decoupling attention Transformer network model, so as to achieve the purpose of training the decoupling attention Transformer network model.

S26, the decoupling attention Transformer network model is trained by mask autoregressive self-supervised learning based on the Token semantic representation features of the text data.

The mask autoregressive self-supervised learning may be understood as follows. For the input of the text data including multiple characters, the text data is divided into n Tokens, each Token is encoded, at least one Token is masked and not used as the input of the model, and the remaining Tokens are taken as the input to input the decoupling attention Transformer network model to obtain the Token semantic representation features of the text data. The masked Token may be predicted, and then the predicted Token may be compared with the masked Token, to adjust the parameters in the decoupling attention Transformer network model, so as to achieve the purpose of training the decoupling attention Transformer network model.

S27, the decoupling attention Transformer network model is trained by cross-modal correlation comparison learning based on the cross-modal semantic representation features of the image-text pair data.

The cross-modal correlation comparison learning may be understood as follows. The image-text pair data includes the image data and the text data. For the input of the image data of the image, the image is divided into n Tokens, each Token is encoded, at least one Token is taken out and not used as the input of the model, and the remaining Tokens are taken as the input. For the input of the text data including multiple characters, the text data is divided into n Tokens, each Token is encoded, at least one Token is masked and not used as the input of the model, and the remaining Tokens are taken as the input.

The Tokens of the image data input and the Tokens of the text data input are jointly input to the decoupling attention Transformer network model. When predicting the Token taken out from the image data input and the masked Token of the text data input, they may be predicted together by the combination of the correlation of the image data and the text data, that is, the cross-modal correlation, to obtain the Token semantic representation features of the image data, predict the Token taken out from the image data input, obtain the Token semantic representation features of the text data, and predict the Token masked. They are compared and analyzed separately, and the parameters in the decoupling attention Transformer network model are adjusted to achieve the purpose of training the decoupling attention Transformer network model.

In embodiments of the disclosure, the self-supervised learning of image reconstruction may be used on images, the mask autoregressive self-supervised learning may be used on text, and the cross-modal correlation comparison learning may be used on image-text pairs, so as to achieve the unified end-to-end learning on data of a variety of different models. At the same time, in the process of training the decoupling attention Transformer network model, for the image-text pair data, the correlation of the image-text pair data may be predicted, which may improve the robustness of the decoupling attention Transformer network model.

In some embodiments, training the decoupling attention Transformer network model by cross-modal correlation comparison learning based on the cross-modal semantic representation features of the image-text pair data includes: training the decoupling attention Transformer network model by using correlation ranking, based on the cross-modal correlation comparative learning.

In embodiments of the disclosure, the cross-modal correlation comparison learning adopts the correlation ranking idea, which is different from the traditional image-text matching and comparison and may better adapt to a variety of image-text data with different degrees of correlation.

With the method for training a model based on multi-modal data joint learning provided in embodiments of the disclosure, it may simultaneously use the single-modal data and the Pair multi-modal data on the network to train the decoupling attention Transformer network model, so as to effectively use a variety of different modal data to enhance each other, obtain the more robust and more powerful general semantic representation ability from the multi-modal data, use a unified network structure model to process data of different modalities, and perform tasks of understanding and generating data of different modalities, which may also have the more accurate scene cognition and more comprehensive logical reasoning ability.

Figure 4:
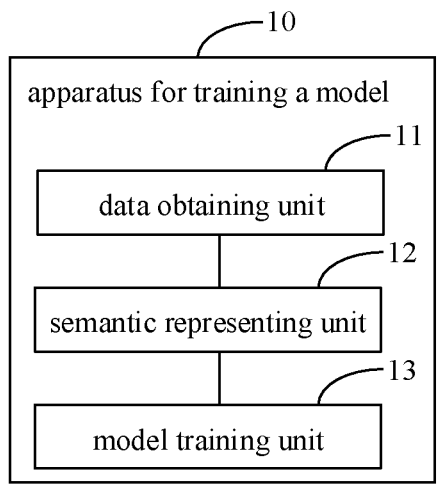
FIG. 4 is a schematic diagram according to a third embodiment of the disclosure.

FIG. 4 is a schematic diagram according to a third embodiment of the disclosure.

As shown in FIG. 4, an apparatus 10 for training a model based on multi-modal data joint learning may also be provided in a third embodiment of the disclosure. The apparatus 10 includes a data obtaining unit 11, a semantic representing unit 12 and a model training unit 13.

The data obtaining unit 11 is configured to obtain multi-modal data; in which the multi-modal data include at least one type of single-modal data and at least one type of Pair multi-modal data.

The semantic representing unit 12 is configured to input the single-modal data and the Pair multi-modal data into a decoupling attention Transformer network model to generate respectively semantic element Token semantic representation features and cross-modal semantic representation features.

The model training unit 13 is configured to train the decoupling attention Transformer network model based on the Token semantic representation features and the cross-modal semantic representation features.

With the apparatus 10 for training a model based on multi-modal data joint learning provided in embodiments of the disclosure, the data obtaining unit 11 is configured to obtain multi-modal data; in which the multi-modal data include at least one type of single-modal data and at least one type of Pair multi-modal data; the semantic representing unit 12 is configured to input the single-modal data and the Pair multi-modal data into a decoupling attention Transformer network model to generate respectively semantic element Token semantic representation features and cross-modal semantic representation features; and the model training unit 13 is configured to train the decoupling attention Transformer network model based on the Token semantic representation features and the cross-modal semantic representation features. Thus, the decoupling attention Transformer network model is trained, so as to effectively use a variety of different modal data to enhance each other, obtain the more robust and more powerful general semantic representation ability from the multi-modal data, use a unified network structure model to process data of different modalities, and perform tasks of understanding and generating data of different modalities, which may also have the more accurate scene cognition and more comprehensive logical reasoning ability.

Figure 5:
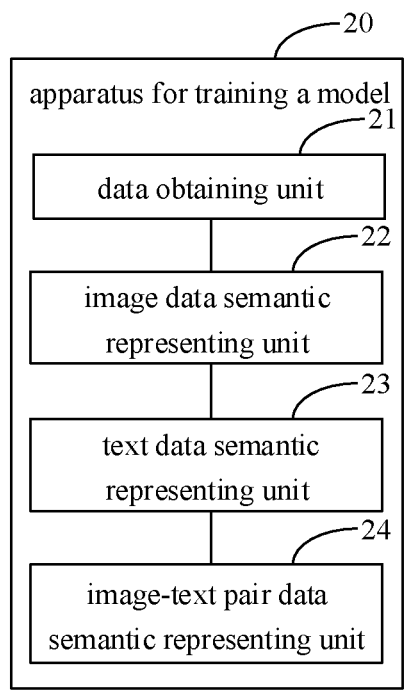
FIG. 5 is a schematic diagram according to a fourth embodiment of the disclosure.

FIG. 5 is a schematic diagram according to a fourth embodiment of the disclosure.

As shown in FIG. 2, an apparatus 20 for training a model based on multi-modal data joint learning may also be provided in a fourth embodiment of the disclosure. In some embodiments, the at least one type of single-modal data include image data and text data. The at least one type of Pair multi-modal data include image-text pair data. The decoupling attention Transformer network model includes a network structure including an intra-modal attention mechanism, an inter-modal attention mechanism and a modal information fusion layer.

The apparatus 20 in embodiments of the disclosure may include: a data obtaining unit 21, an image data semantic representing unit 22, a text data semantic representing unit 23 and an image-text pair data semantic representing unit 24.

The data obtaining unit 21 is configured to obtain multi-modal data; in which the multi-modal data include at least one type of single-modal data and at least one type of Pair multi-modal data.

The image data semantic representing unit 22 is configured to split the image data into multiple Tokens, and generate Token semantic representation features of the image data after learning through a multi-layer intra-modal attention mechanism.

The text data semantic representing unit 23 is configured to split the text data into multiple Tokens, and generate Token semantic representation features of the text data after learning through the multi-layer intra-modal attention mechanism.

The image-text pair data semantic representing unit 24 is configured to split and splice the image-text pair data respectively to generate multiple Tokens of different modalities of the image-text pair data, and generate cross-modal semantic representation features of the image-text pair data after sequentially learning through the multi-layer intra-modal attention mechanism and a multi-layer inter-modal attention mechanism and fusing through the modal information fusion layer.

In some embodiments, the image-text pair data semantic representing unit 24 is further configured to: control cross-modal information of different modalities to fuse by a gating mechanism based on a degree of correlation between different modalities of the image-text pair data.

Figure 6:
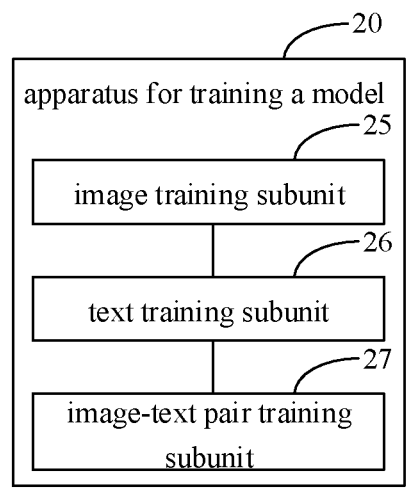
FIG. 6 is another schematic diagram according to a fourth embodiment of the disclosure.

In some embodiments, as shown in FIG. 6, the apparatus 20 in embodiments of the disclosure may further include an image training subunit 25, a text training subunit 26 and an image-text pair training subunit 27.

The image training subunit 25 is configured to train the decoupling attention Transformer network model by image reconstruction self-supervised learning based on the Token semantic representation features of the image data.

The text training subunit 26 is configured to train the decoupling attention Transformer network model by mask autoregressive self-supervised learning based on the Token semantic representation features of the text data.

The image-text pair training subunit 27 is configured to train the decoupling attention Transformer network model by cross-modal correlation comparison learning based on the cross-modal semantic representation features of the image-text pair data.

In some embodiments, the image-text pair training subunit 27 is further configured to: train the decoupling attention Transformer network model by using correlation ranking, based on the cross-modal correlation comparative learning.

It may be understood that the apparatus 20 in FIG. 5 of some embodiments and the apparatus 10 in the above-mentioned embodiments, the data obtaining unit 21 and the data obtaining unit 11 may have the same function and structure.

It should be noted that the foregoing explanations of the method for training a model based on multi-modal data joint learning are also applicable to the apparatus for training a model based on multi-modal data joint learning, which will not be repeated herein.

With the apparatus for training a model based on multi-modal data joint learning provided in embodiments of the disclosure, it may simultaneously use the single-modal data and the Pair multi-modal data on the network to train the decoupling attention Transformer network model, so as to effectively use a variety of different modal data to enhance each other, obtain the more robust and more powerful general semantic representation ability from the multi-modal data, use a unified network structure model to process data of different modalities, and perform tasks of understanding and generating data of different modalities, which may also have the more accurate scene cognition and more comprehensive logical reasoning ability.

According to some embodiments of the disclosure, an electronic device, a readable storage medium and a computer program product are further provided.

Figure 7:
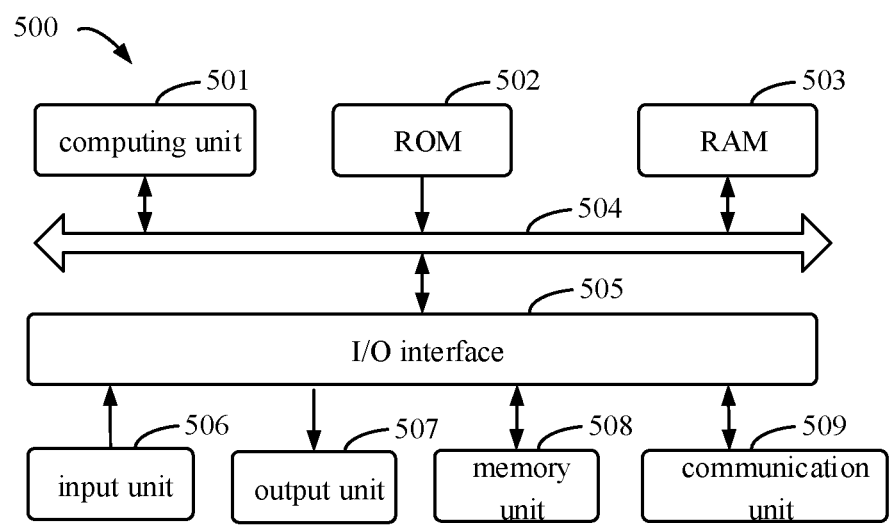
FIG. 7 is a block diagram illustrating an electronic device configured to implement a method for training a model based on multi-modal data joint learning according to some embodiments of the disclosure.

FIG. 7 is a block diagram illustrating an electronic device configured to implement a method for training a model based on multi-modal data joint learning according to some embodiments of the disclosure.

Electronic devices are intended to represent various types of digital computers, such as laptop computers, desktop computers, workstations, personal digital assistants, servers, blade servers, mainframe computers, and other suitable computers. Electronic devices are may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 7, the device 500 includes a computing unit 501 configured to execute various appropriate actions and processings according to the computer program stored in a read-only memory (ROM) 502 or loaded from a memory unit 508 to a random access memory (RAM) 503. In a RAM 503, various programs and data required for a device 500 may be stored. A computing unit 501, a ROM 502 and a ROM 503 may be connected with each other by a bus 504. An input/output (I/O) interface 505 is also connected to a bus 504.

A plurality of components in the device 500 are connected to an I/O interface 505, and includes: an input unit 506, for example, a keyboard, a mouse, etc.; an output unit 507, for example various types of displays, speakers; a memory unit 508, for example a magnetic disk, an optical disk; and a communication unit 509, for example, a network card, a modem, a wireless transceiver. A communication unit 509 allows a device 500 to exchange information/data through a computer network such as internet and/or various types of telecommunication networks and other devices.

The computing unit 501 may be various types of general and/or dedicated processing components with processing and computing ability. Some examples of a computing unit 501 include but not limited to a central processing unit (CPU), a graphic processing unit (GPU), various dedicated artificial intelligence (AI) computing chips, various computing units running a machine learning model algorithm, a digital signal processor (DSP), and any appropriate processor, controller, microcontroller, etc. A computing unit 501 performs various methods and processings as described above, for example, a method for training a model based on multi-modal data joint learning.

For example, in some embodiments, a method for training a model based on multi-modal data joint learning may be further implemented as a computer software program, which is physically contained in a machine readable medium, such as a memory unit 508. In some embodiments, a part or all of the computer program may be loaded and/or installed on the device 500 through a ROM 502 and/or a communication unit 509. When the computer program is loaded on a RAM 503 and executed by a computing unit 501, one or more blocks in the method for training a model based on multi-modal data joint learning as described above may be performed. Alternatively, in other embodiments, a computing unit 501 may be configured to perform a method for training a model based on multi-modal data joint learning in other appropriate methods (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), an application specific standard product (ASSP), a system on a chip (SoC), a complex programmable logic device (CPLD), a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the disclosure may be written with one or any combination of multiple programming languages. These programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the context of the disclosure, a machine-readable medium may be a tangible medium that may contain or store a program intended for use in or in conjunction with an instruction execution system, apparatus, or device. A machine-readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a RAM, a ROM, an EPROM or a flash memory, an optical fiber device, and a compact disc read-only memory(CD-ROM), an optical storage device, a magnetic storage device, or any appropriate combination thereof.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may be further configured to provide interaction with the user; for example, the feedback provided to the user may be any form of sensory feedback (for example, visual feedback, auditory feedback, or tactile feedback); and input from the user may be received in any form (including an acoustic input, a voice input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). The examples of a communication network include a Local Area Network (LAN), a Wide Area Network (WAN), an internet and a blockchain network.

The computer system may include a client and a server. The client and server are generally far away from each other and generally interact with each other through a communication network. The relation between the client and the server is generated by computer programs that run on the corresponding computer and have a client-server relationship with each other. A server may be a cloud server, also known as a cloud computing server or a cloud host, is a host product in a cloud computing service system, to solve the shortcomings of large management difficulty and weak business expansibility existed in the traditional physical host and Virtual Private Server (VPS) service. A server further may be a server with a distributed system, or a server in combination with a blockchain.

Unless the context requires otherwise, throughout the specification and claims, the term "comprising" is to be interpreted as an open, inclusive meaning, i.e., "including, but not limited to." Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the disclosure. Furthermore, the particular features, structures, materials, or characteristics may be combined in any suitable manner in one or more embodiments or examples.

It should be understood that "plurality" or "multiple" may refer to two or more. The term "and/or" may describe association relationships of associated objects, indicating that there may be three types of relationships, for example, A and/or B, which may mean: A exists alone, A and B exist at the same time, and B exists alone. The character "/" generally indicates that the associated objects before and after are in an "or" relationship.

The use of "configured to" herein means open and inclusive language that does not preclude devices adapted or configured to perform additional tasks or steps.

Additionally, the use of "based on" is meant to be open and inclusive, as a process, step, calculation or other action "based on" one or more of the stated conditions or values may in practice be based on additional conditions or beyond the stated values.

It should be understood that, various forms of procedures shown above may be configured to reorder, add or delete blocks. For example, blocks described in the disclosure may be executed in parallel, sequentially, or in a different order, as long as the desired result of the technical solution disclosed in the disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the disclosure shall be included within the protection scope of embodiments of the disclosure.

The invention claimed is:

1. A method for training a model based on multi-modal data joint learning, comprising:
   obtaining multi-modal data; wherein the multi-modal data comprise single-modal data and Pair multi-modal data;
   inputting the single-modal data and the Pair multi-modal data into a decoupling attention Transformer network model to generate respectively semantic element Token semantic representation features and cross-modal semantic representation features; and
   training the decoupling attention Transformer network model based on the Token semantic representation features and the cross-modal semantic representation features,
   wherein the single-modal data comprise image data and text data; the Pair multi-modal data comprise image-text pair data; the decoupling attention Transformer network model comprises a network structure including an intra-modal attention mechanism, an inter-modal attention mechanism and a modal information fusion layer; and
   wherein inputting the single-modal data and the Pair multi-modal data into the decoupling attention Transformer network model to generate respectively the Token semantic representation features and the cross-modal semantic representation features comprises:
   splitting the image data into multiple Tokens, and generating Token semantic representation features of the image data after learning through a multi-layer intra-modal attention mechanism;
   splitting the text data into multiple Tokens, and generating Token semantic representation features of the text data after learning through the multi-layer intra-modal attention mechanism; and
   splitting and splicing the image-text pair data respectively to generate multiple Tokens of different modalities of the image-text pair data, and generating cross-modal semantic representation features of the image-text pair data after sequentially learning through the multi-layer intra-modal attention mechanism and a multi-layer inter-modal attention mechanism and fusing through the modal information fusion layer.

2. The method as claimed in claim 1, wherein fusing through the modal information fusion layer comprises:
   controlling cross-modal information of different modalities to fuse by a gating mechanism based on a degree of correlation between different modalities of the image-text pair data.

3. The method as claimed in claim 1, wherein training the decoupling attention Transformer network model based on the Token semantic representation features and the cross-modal semantic representation features comprises:
   training the decoupling attention Transformer network model by image reconstruction self-supervised learning based on the Token semantic representation features of the image data;
   training the decoupling attention Transformer network model by mask autoregressive self-supervised learning based on the Token semantic representation features of the text data; and
   training the decoupling attention Transformer network model by cross-modal correlation comparison learning based on the cross-modal semantic representation features of the image-text pair data.

4. The method as claimed in claim 3, wherein training the decoupling attention Transformer network model by cross-modal correlation comparison learning based on the cross-modal semantic representation features of the image-text pair data comprises:
   training the decoupling attention Transformer network model by using correlation ranking, based on the cross-modal correlation comparative learning.

5. An electronic device, comprising:
   at least one processor; and
   a memory communicatively connected to the at least one processor; wherein,
   the memory is configured to store instructions executable by the at least one processor, and when the instructions are performed by the at least one processor, the at least one processor is caused to carry out:
   obtaining multi-modal data; wherein the multi-modal data comprise single-modal data and Pair multi-modal data;
   inputting the single-modal data and the Pair multi-modal data into a decoupling attention Transformer network model to generate respectively semantic element Token semantic representation features and cross-modal semantic representation features; and
   training the decoupling attention Transformer network model based on the Token semantic representation features and the cross-modal semantic representation features,
   wherein the single-modal data comprise image data and text data; the Pair multi-modal data comprise image-text pair data; the decoupling attention Transformer network model comprises a network structure including an intra-modal attention mechanism, an inter-modal attention mechanism and a modal information fusion layer; and
   wherein inputting the single-modal data and the Pair multi-modal data into the decoupling attention Transformer network model to generate respectively the Token semantic representation features and the cross-modal semantic representation features comprises:
   splitting the image data into multiple Tokens, and generating Token semantic representation features of the image data after learning through a multi-layer intra-modal attention mechanism;
   splitting the text data into multiple Tokens, and generating Token semantic representation features of the text data after learning through the multi-layer intra-modal attention mechanism; and
   splitting and splicing the image-text pair data respectively to generate multiple Tokens of different modalities of the image-text pair data, and generating cross-modal semantic representation features of the image-text pair data after sequentially learning through the multi-layer intra-modal attention mechanism and a multi-layer inter-modal attention mechanism and fusing through the modal information fusion layer.

6. The device as claimed in claim 5, wherein fusing through the modal information fusion layer comprises:
controlling cross-modal information of different modalities to fuse by a gating mechanism based on a degree of correlation between different modalities of the image-text pair data.

7. The device as claimed in claim 5, wherein training the decoupling attention Transformer network model based on the Token semantic representation features and the cross-modal semantic representation features comprises:
training the decoupling attention Transformer network model by image reconstruction self-supervised learning based on the Token semantic representation features of the image data;
training the decoupling attention Transformer network model by mask autoregressive self-supervised learning based on the Token semantic representation features of the text data; and
training the decoupling attention Transformer network model by cross-modal correlation comparison learning based on the cross-modal semantic representation features of the image-text pair data.

8. The device as claimed in claim 7, wherein training the decoupling attention Transformer network model by cross-modal correlation comparison learning based on the cross-modal semantic representation features of the image-text pair data comprises:
training the decoupling attention Transformer network model by using correlation ranking, based on the cross-modal correlation comparative learning.

9. A non-transitory computer-readable storage medium stored with computer instructions, wherein, the computer instructions are configured to cause a computer to perform a method for training a model based on multi-modal data joint learning, the method including:
obtaining multi-modal data; wherein the multi-modal data comprise single-modal data and Pair multi-modal data;
inputting the single-modal data and the Pair multi-modal data into a decoupling attention Transformer network model to generate respectively semantic element Token semantic representation features and cross-modal semantic representation features; and
training the decoupling attention Transformer network model based on the Token semantic representation features and the cross-modal semantic representation features,
wherein the single-modal data comprise image data and text data; the Pair multi-modal data comprise image-text pair data; the decoupling attention Transformer network model comprises a network structure including an intra-modal attention mechanism, an inter-modal attention mechanism and a modal information fusion layer; and
wherein inputting the single-modal data and the Pair multi-modal data into the decoupling attention Transformer network model to generate respectively the Token semantic representation features and the cross-modal semantic representation features comprises:
splitting the image data into multiple Tokens, and generating Token semantic representation features of the image data after learning through a multi-layer intra-modal attention mechanism;
splitting the text data into multiple Tokens, and generating Token semantic representation features of the text data after learning through the multi-layer intra-modal attention mechanism; and
splitting and splicing the image-text pair data respectively to generate multiple Tokens of different modalities of the image-text pair data, and generating cross-modal semantic representation features of the image-text pair data after sequentially learning through the multi-layer intra-modal attention mechanism and a multi-layer inter-modal attention mechanism and fusing through the modal information fusion layer.

10. The non-transitory computer-readable storage medium as claimed in claim 9, wherein fusing through the modal information fusion layer comprises:
controlling cross-modal information of different modalities to fuse by a gating mechanism based on a degree of correlation between different modalities of the image-text pair data.

11. The non-transitory computer-readable storage medium as claimed in claim 9, wherein training the decoupling attention Transformer network model based on the Token semantic representation features and the cross-modal semantic representation features comprises:
training the decoupling attention Transformer network model by image reconstruction self-supervised learning based on the Token semantic representation features of the image data;
training the decoupling attention Transformer network model by mask autoregressive self-supervised learning based on the Token semantic representation features of the text data; and
training the decoupling attention Transformer network model by cross-modal correlation comparison learning based on the cross-modal semantic representation features of the image-text pair data.

12. The non-transitory computer-readable storage medium as claimed in claim 11, wherein training the decoupling attention Transformer network model by cross-modal correlation comparison learning based on the cross-modal semantic representation features of the image-text pair data comprises:
training the decoupling attention Transformer network model by using correlation ranking, based on the cross-modal correlation comparative learning.

* * * * *